US012409717B2

(12) United States Patent
Remboski et al.

(10) Patent No.: US 12,409,717 B2
(45) Date of Patent: Sep. 9, 2025

(54) COMPACT E-AXLE ASSEMBLY

(71) Applicant: Electric Propulsion Technologies, LLC, Farmington Hills, MI (US)

(72) Inventors: Donald Remboski, Ann Arbor, MI (US); William Kroppe, Novi, MI (US); Gary Rogers, Novi, MI (US); Mark Versteyhe, Oostkamp (BE); John Stoiber, Oregon, OH (US)

(73) Assignee: Electric Propulsion Technologies, LLC

( * ) Notice: Subject to any disclaimer, the term of this patent is extended or adjusted under 35 U.S.C. 154(b) by 0 days.

(21) Appl. No.: 18/350,783

(22) Filed: Jul. 12, 2023

(65) Prior Publication Data

US 2024/0017602 A1    Jan. 18, 2024

Related U.S. Application Data

(60) Provisional application No. 63/388,267, filed on Jul. 12, 2022.

(51) Int. Cl.
*B60K 1/00* (2006.01)
*B60B 35/14* (2006.01)
(Continued)

(52) U.S. Cl.
CPC ................ *B60K 1/00* (2013.01); *B60B 35/14* (2013.01); *B60B 35/163* (2013.01); *B60K 1/02* (2013.01);
(Continued)

(58) Field of Classification Search
CPC ........ B60K 1/02; B60K 17/043; B60K 17/08; B60K 17/165; B60K 2001/001;
(Continued)

(56) References Cited

U.S. PATENT DOCUMENTS 5,372,213 A * 12/1994 Hasebe ................. B60K 1/02
184/6.12
5,419,406 A * 5/1995 Kawamoto ............ B60K 1/02
475/5

(Continued)

FOREIGN PATENT DOCUMENTS

| CN | 109624681 A | 4/2019 | |
|---|---|---|---|
| DE | 102004037266 A1 * | 2/2006 | ........... B60K 17/046 |
| DE | 102019202994 A1 | 9/2020 | |
| DE | 102019206967 A1 * | 11/2020 | |

OTHER PUBLICATIONS

International Search Report; PCT/US2023/070017; Dec. 14, 2023; 5 pages.

*Primary Examiner* — Tinh Dang
(74) *Attorney, Agent, or Firm* — Dickinson Wright PLLC

(57) ABSTRACT

An e-axle assembly includes a housing extending from a first housing end to a second housing end to define an internal compartment. At least one electric motor is disposed in the internal compartment and includes a stator and a rotor rotatable relative to the stator about an axis. The rotor defines a hollow extending internally within the rotor, and at least one of a gearing mechanism, a shifting actuator, and/or a differential is disposed within the hollow (and thus packaged within the rotor). In a preferred arrangement, all and any of the gearing mechanisms, shifting actuators, and differential are disposed within the hollow of the rotor. This internal packaging of the drive components within the rotor reduces an overall space and weight of the e-axle assembly relative to the prior art designs to more easily and readily achieve the smaller space and weight allotments afforded by electric and/or hybrid vehicles.

4 Claims, 4 Drawing Sheets

(51) Int. Cl.
- *B60B 35/16* (2006.01)
- *B60K 1/02* (2006.01)
- *B60K 7/00* (2006.01)
- *B60K 17/04* (2006.01)
- *B60K 17/08* (2006.01)
- *B60K 17/16* (2006.01)
- *F16H 48/00* (2012.01)
- *F16H 57/02* (2012.01)

(52) U.S. Cl.
CPC ............ *B60K 17/043* (2013.01); *B60K 17/08* (2013.01); *B60K 17/165* (2013.01); *B60K 2001/001* (2013.01); *F16H 48/00* (2013.01); *F16H 2057/02034* (2013.01); *F16H 2057/02052* (2013.01); *F16H 2200/0021* (2013.01); *F16H 2200/0034* (2013.01); *F16H 2200/2005* (2013.01); *F16H 2200/2035* (2013.01)

(58) Field of Classification Search
CPC . F16H 2057/02034; F16H 2057/02052; F16H 2200/0021; F16H 2200/0034; F16H 2200/2005; F16H 2200/2035; F16H 3/001–3/78

See application file for complete search history.

(56) References Cited

U.S. PATENT DOCUMENTS

| | | | | |
|---|---|---|---|---|
| 5,457,363 | A * | 10/1995 | Yoshii | B60L 15/2009 318/432 |
| 5,528,094 | A * | 6/1996 | Hasebe | B60K 17/16 310/112 |
| 5,637,048 | A * | 6/1997 | Maeda | H02K 7/116 475/150 |
| 7,339,300 | B2 * | 3/2008 | Burgman | B60L 50/61 310/90 |
| 8,177,007 | B2 * | 5/2012 | Abe | F16H 48/36 180/65.265 |
| 8,968,138 | B2 * | 3/2015 | Kalmbach | H02K 7/116 475/150 |
| 9,255,633 | B2 * | 2/2016 | Märkl | B60K 17/165 |
| 9,664,261 | B1 * | 5/2017 | Linton | F16H 48/05 |
| 2006/0046887 | A1 * | 3/2006 | Bennett | B60L 3/0061 475/150 |
| 2013/0123058 | A1 * | 5/2013 | Märkl | B60K 17/165 475/150 |
| 2013/0178320 | A1 * | 7/2013 | Suzuki | B60L 3/0061 74/661 |
| 2013/0260956 | A1 * | 10/2013 | Noguchi | B60K 1/02 477/3 |
| 2013/0274050 | A1 * | 10/2013 | Kalmbach | H02K 7/006 475/149 |
| 2022/0364631 | A1 * | 11/2022 | Glückler | F16H 3/66 |

* cited by examiner

COMPACT E-AXLE ASSEMBLY

CROSS-REFERENCE TO RELATED APPLICATION

The subject application claims priority to U.S. Provisional Patent Application Ser. No. 63/388,267 filed on Jul. 12, 2022, the entire disclosure of which is incorporated herein by reference.

BACKGROUND OF THE INVENTION

1. Field of the Invention

The present invention relates to live axles for vehicles, including both solid beam-type axles and independently suspended axles. More particularly, the present invention relates to an e-axle assembly for an electric or hybrid vehicle.

2. Related Art

This section provides background information related to the present disclosure which is not necessarily prior art.

An e-axle assembly is a powertrain electric drive unit for electric or hybrid vehicles which combines the motor, inverter, power electronics and other transmission elements together, aiming to make electric drive of the related electric or hybrid vehicle less complex. The e-axle assembly seeks a compact and cost effective design as a result of integrating the electric motor, power electronics and gearbox in one unit.

However, traditional e-axle assemblies require large package space claims to allow for the large motor and gear reduction structures to be integrated into the e-axle assembly. Put another way, the conventional motor structure and parallel axis gearing in traditional e-axle assemblies leads to much larger space claims, as well as higher weight for the center section of the e-axle assembly as compared to conventional live axles. Furthermore, the conventional rotor structures, attached parallel axis or coaxial gearing, and side-gear differential still make the e-axle assembly difficult to fit in the space and weight allotments afforded by the electric or hybrid vehicle.

Accordingly, there is a continuing desire to further develop more compact e-axle assemblies to further reduce their size and weight requirements to facilitate simpler implementation into the space and weight allotments afforded by the electric or hybrid vehicle.

SUMMARY OF THE INVENTION

According to an aspect of the disclosure, an e-axle assembly includes a housing extending from a first housing end to a second housing end to define an internal compartment. At least one electric motor is disposed in the internal compartment and includes a stator and a rotor rotatable relative to the stator about an axis. The rotor defines a hollow extending internally within the rotor and along the axis, and at least one of a gearing mechanism, a shifting actuator, and/or a differential is disposed within the hollow (and thus packaged within the rotor). In a preferred arrangement, all and any of the gearing mechanisms, shifting actuators, and differential are disposed within the hollow of the rotor. This internal packaging of the drive components within the rotor reduces an overall space and weight of the e-axle assembly relative to the prior art e-axle assembly designs to more easily and readily achieve the smaller space and weight allotments afforded by electric and/or hybrid vehicles.

BRIEF DESCRIPTION OF THE DRAWINGS

Other aspects and advantages of the present disclosure will be readily appreciated, as the same becomes better understood by reference to the following detailed description when considered in connection with the accompanying drawings wherein.

DETAILED DESCRIPTION OF THE ENABLING EMBODIMENTS

Figure 1:
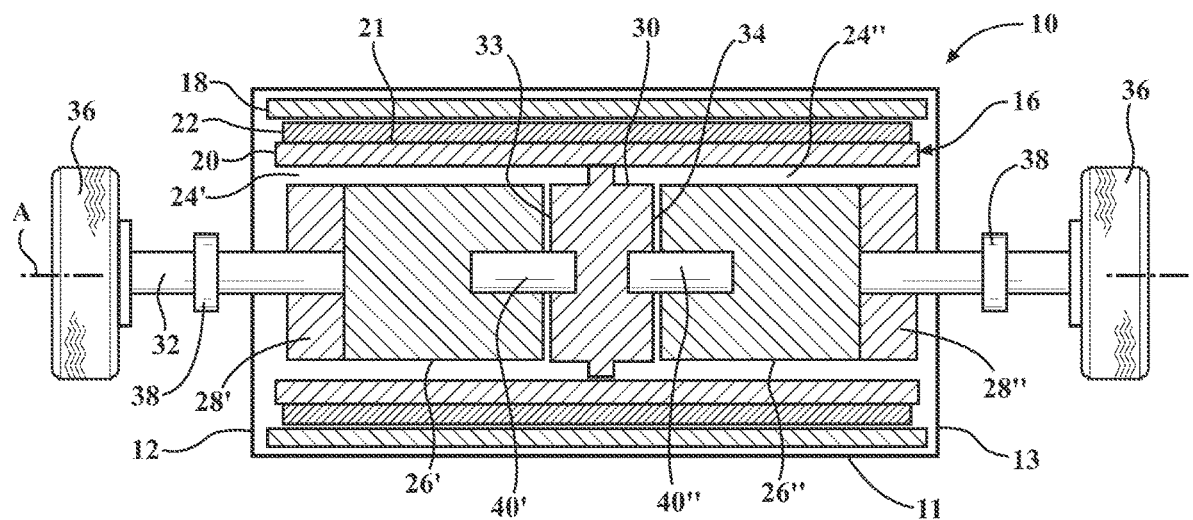
FIG. 1 illustrates a first embodiment of an e-axle assembly.

Example embodiments will now be described more fully with reference to the accompanying drawings. In general, the subject embodiments are directed to an e-axle assembly 10 for an electric or hybrid vehicle. However, the example embodiments are only provided so that this disclosure will be thorough, and will fully convey the scope to those who are skilled in the art. Numerous specific details are set forth such as examples of specific components, devices, and methods, to provide a thorough understanding of the embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, the e-axle assembly 10 includes a housing 11 (such as a central drive unit housing) which extends from a first housing end 12 to a second housing end 13 to define an internal compartment 14. At least one electric motor 16 is disposed in the internal compartment 14 and includes a stator 18 and a rotor 20 rotatable relative to the stator 18 about an axis A. As illustrated throughout the Figures, a plurality of surface mount magnets 22 can be disposed along an exterior rotor surface 21 of the rotor 20 for facilitating rotation of the rotor 20 relative to the stator 18. The rotor 20 defines a hollow 24 extending internally within the rotor 20 and along the axis A, and at least one of a gearing mechanism 26, a shifting actuator 28, and/or a differential 30 is disposed within the hollow 24 (and thus packaged within the rotor 20) to achieve a reduced overall size and weight of the e-axle assembly 10 relative to the prior art e-axle assembly designs.

As best illustrated in FIGS. 1-5, in accordance with an aspect of the disclosure, at least one gearing mechanism 26 and at least one shifting actuator 28 are both disposed within the hollow 24 of the rotor 20. As further illustrated in FIGS. 1-2, the differential 30 can also be disposed within the hollow 24 (in addition to the at least one gearing mechanism 26 and the at least one shifting actuator 28), particularly when only one electric motor 16 is disposed within the internal compartment 14 of the housing 11. In any arrangement, a pair of output shafts 32 extend outwardly from respective first and second housing ends 12, 13 of the housing 11 for operably coupling the e-axle assembly 10 to the wheels 36 of the electric or hybrid vehicle, either directly or indirectly through wheel-end reducers 38.

As illustrated in FIG. 1, in accordance with a first embodiment, the e-axle assembly 10 includes a single electric motor 16 which houses a pair of shift packages (i.e., two gearing mechanisms 26', 26" and two shift actuators 28', 28" each respectively paired with one another) and a differential 30 within the hollow 24 defined by the rotor 20. In this arrangement, the rotor 20 is operably connected to and drives the differential 30 arranged centrally within the internal compartment 14 as a high speed differential. The differential 30 presents a pair of opposing first and second differential sides 33, 34, with the first differential side 32 facing the first housing end 12 and the second differential side 34 facing the second housing end 13. The at least one gearing mechanism 26 includes a first gearing mechanism 26' disposed within the hollow 24 adjacent the first housing end 12 and a second gearing mechanism 26" disposed within the hollow 24 adjacent the second housing end 13. The first gearing mechanism 26' is operably connected to the first differential side 33 of the differential 30 via a first gear shaft 40' and the second gearing mechanism 26" is operably connected to the second differential side 34 of the differential 30 via a second gear shaft 40" for driving torque from the differential 30 to the respective first and second gearing mechanisms 26', 26". The first and second gearing mechanisms 26', 26" are each preferably planetary gear stages fitted with a two-stage shift mechanism which selects output from the planetary sun gear for high range or selects output from the planetary carrier for low range.

The at least one shifting actuator 28 includes a first shifting actuator 28' and a second shifting actuator 28' each preferably arranged as two-speed actuators and each operably connected to a respective one of the first and second gearing mechanisms 26', 26" for operating the respective two-stage shift mechanism. A pair of output shafts 32 are each operably connected to a respective one of the first and second gearing mechanisms 26', 26" and extend outwardly from opposing first and second housing ends 12, 13 of the housing 11 for sending output torque to the wheels 36 or wheel-end reducers 38 of the electric or hybrid vehicle. With reference to FIG. 1 and the aforementioned description, a power flow of the first embodiment of the e-axle assembly 10 proceeds by the rotor 20 driving the differential 30, the differential 30 driving the first stage suns of the planetary gear stages in each of the first and second gearing mechanisms 26', 26" and the first stage carriers of the planetary gear stages in each of the first and second gearing mechanisms 26', 26" respectively driving one of the output shafts 32. An optional locker and optional limited slip could be incorporated into the first embodiment without departing from the scope of the subject disclosure.

Figure 2:
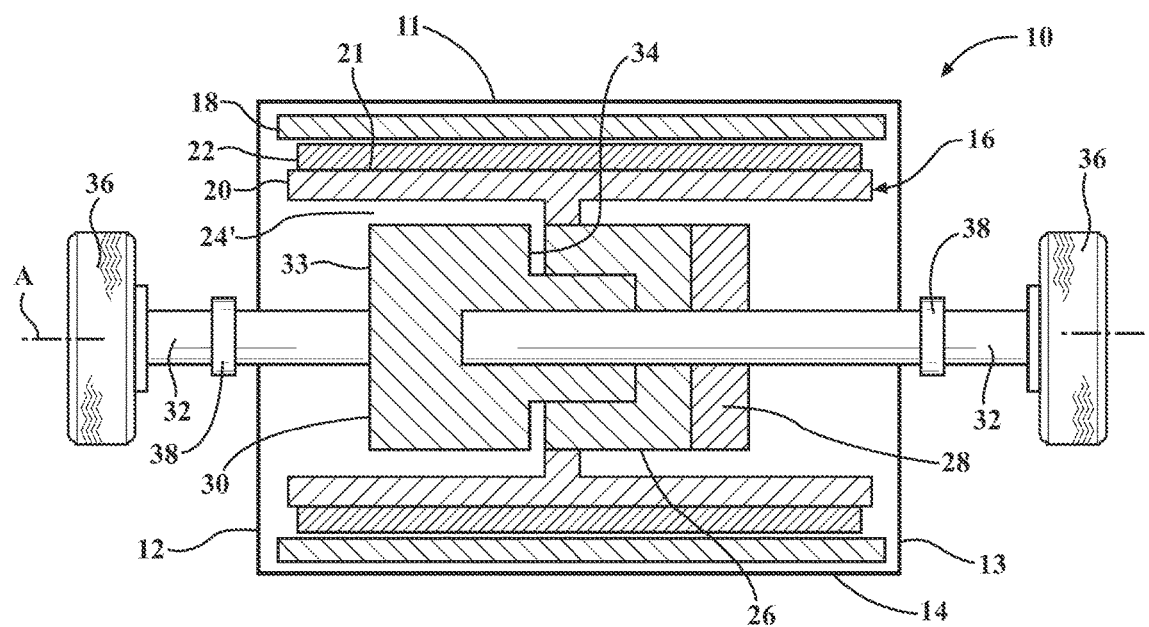
FIG. 2 illustrates a second embodiment of the e-axle assembly.

As illustrated in FIG. 2, in accordance with a second embodiment, the e-axle assembly 10 similarly includes a single electric motor 16, but in this instance houses a single shift package (i.e., a single gearing mechanism 26 and a single shifting actuator 28 paired with one another) and a differential 30 within the hollow 24 defined by the rotor 20. In this arrangement, the rotor 20 is operably connected to and drives the single gearing mechanism 26 arranged as a central planetary reducer. Although the operable connection between the rotor 20 and the single gearing mechanism 26 is illustrated as being arranged in the central portion of the rotor 20, the operable connection between the rotor 20 and the gearing mechanism 26 can also be offset and adjacent a rotor end of the rotor 20 without departing from the scope of the subject disclosure. The planetary reducer of the single gearing mechanism 26 can be fitted with a two-speed shift mechanism which selects output from the planetary sun gear for high range or selects output from the planetary carrier for low range.

The single shifting actuator 28 is operably connected to the single gearing mechanism 26 for operating the two-speed shift mechanism of the gearing mechanism 26. An output of the single gearing mechanism 26 is coupled to and drives the differential 30 and a pair of output shafts 32 are operably coupled to the differential 30 on respective first and second differential sides 33, 34 and extend outwardly from opposing first and second housing ends 12, 13 for sending output torque to the wheels 36 or wheel-end reducers 38 of the electric or hybrid vehicle. With reference to FIG. 2 and the aforementioned description, a power flow of the second embodiment of the e-axle assembly 10 proceeds by the rotor 20 driving the first stage sun of the planetary reducer in the gearing mechanism 26, the first stage carrier of the planetary reducer in the gearing mechanism 26 driving the differential 30, and the differential 30 driving the pair of output shafts 32. An optional locker and optional limited slip could also be incorporated into the second embodiment without departing from the scope of the subject disclosure.

In either of the first or second embodiments of the e-axle assembly 10, the differential 30 can be arranged as a bevel gear or planetary, open or torque transferring (viscous, hydraulic, Torsen, Quaife, dog clutch, or Belleville/conical spring) without departing from the scope of the subject disclosure.

Figure 3:
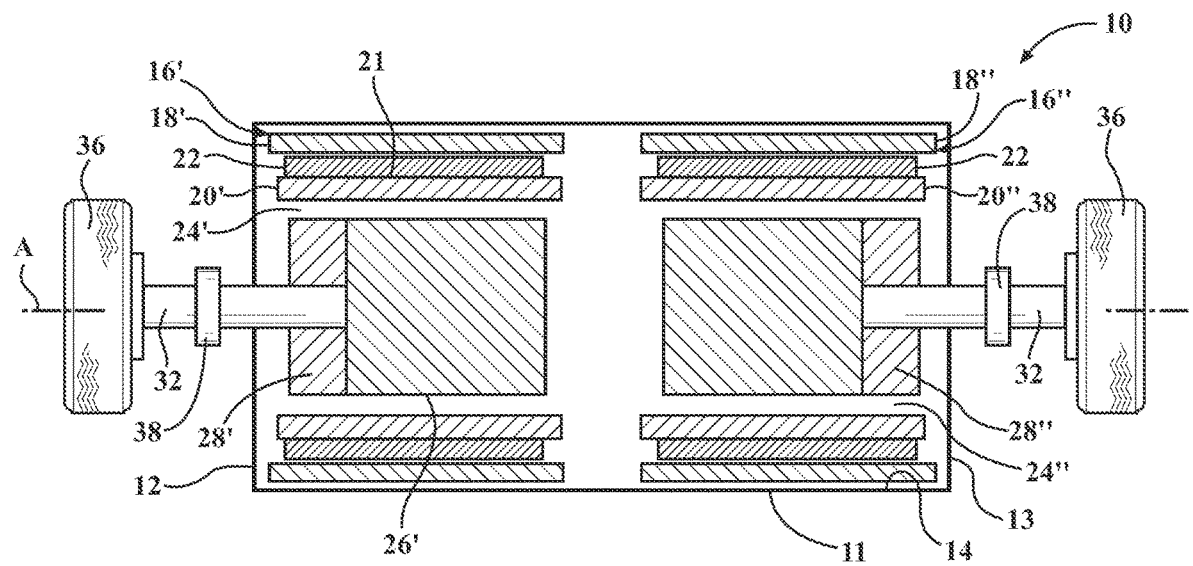
FIG. 3 illustrates a third embodiment of the e-axle assembly.
Figure 4:
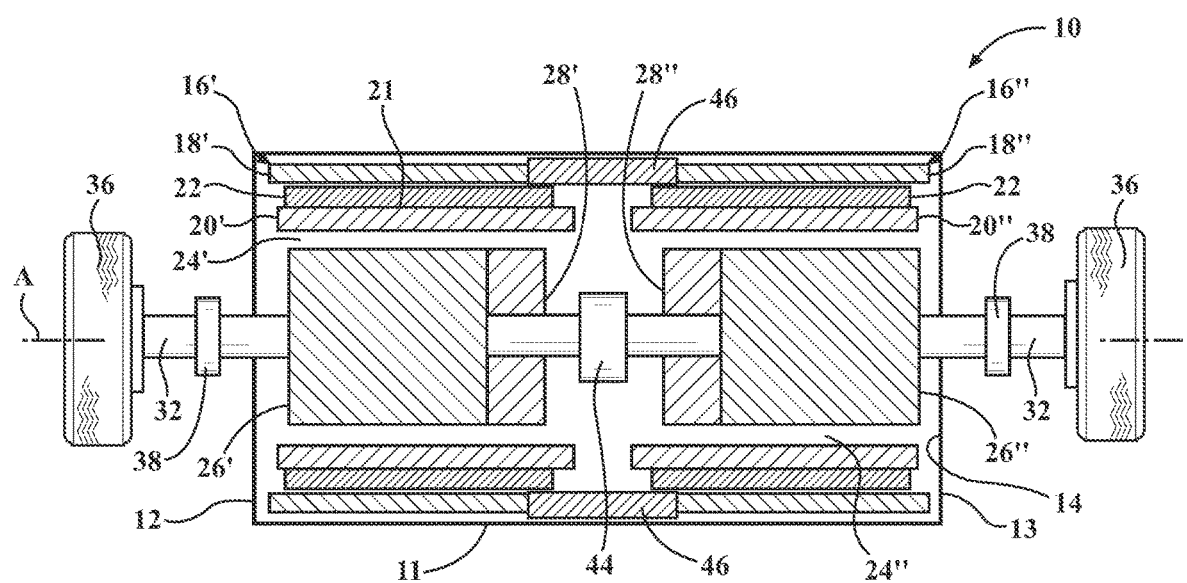
FIG. 4 illustrates a fourth embodiment of the e-axle assembly.
Figure 5:
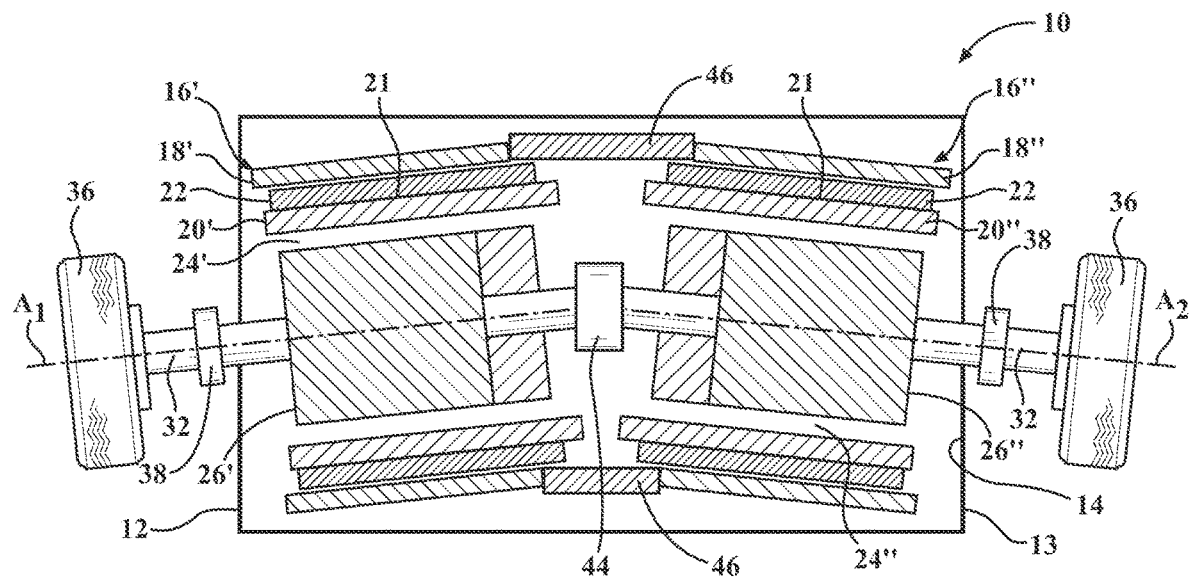
FIG. 5 illustrates a fifth embodiment of the e-axle assembly.

As illustrated in FIGS. 3-5, in accordance with a third, fourth and fifth embodiment, the e-axle assembly includes a first and second electric motor 16', 16" disposed within the internal compartment 14 of the housing 11, each adjacent a respective first or second housing end 12, 13 and in axially spaced relationship with one another. In accordance with the previous disclosure, the first electric motor 16' includes a first stator 18' and a first rotor 20' rotatable relative to the first stator 18' about the A, and the second electric motor 16" includes a second stator 18" and a second rotor 20" rotatable relative to the second stator 18" about the axis A. Each of the first and second rotors 20', 20" define respective first and second hollows 24', 24" extending within the rotors 20', 20" and along the axis A. A first gearing mechanism 26' and a first shifting actuator 28' are disposed within the first hollow 24' of the first rotor 20' and a second gearing mechanism 26" and a second shifting actuator 28" are disposed within the second hollow 24" of the second rotor 20". Each of the first and second electric motors 16', 16" are coupled with a respective one of the output shafts 32, and thus a differential is not included in these embodiments for outputting torque to the wheels 36 or wheel-end reducers 38 of the electric or hybrid vehicle. More specifically, a first output shaft of the pair of output shafts 32 is operably connected to the first electric motor 16' and extends outwardly from the first housing end 12 for connection to a first wheel of the electric or hybrid vehicle and a second output shaft of the pair of output shafts 32 is operably connected to the second electric motor and extends outwardly from the second housing end 13 for connection to a second wheel of the electric or hybrid vehicle.

The first rotor 20' is operably connected to and drives the first gearing mechanism 26' and the second rotor 20" is operably connected to and drives the second gearing mechanism 26". Each of the first and second gearing mechanisms 26', 26" are preferably arranged as planetary reducers, such that the rotors 20', 20" drive the planetary reducers in the first and second gearing mechanisms 26', 26" through a rotor to sun gear connecting hub 42. Similar to the other embodiments, the planetary reducers of the first and second gearing mechanisms 26', 26" can be fitted with a two-speed shift mechanism which selects output from the planetary sun gear for high range or selects output from the planetary carrier for low range.

The first shifting actuator 28' is operably connected to the first gearing mechanism 26' and the second shifting actuator 28" is operably connected to the second gearing mechanism 26" for operating the two-speed shift mechanisms. A pair of output shafts 32 are operably connected to a respective one of the first and second gearing mechanisms 26', 26" and extend outwardly from opposing first and second housing ends 12, 13 for sending output torque to wheels 36 or wheel-end reducers 38 of the electric or hybrid vehicle. With reference to FIGS. 3-5 and the aforementioned description, a power flow of these three embodiments of the e-axle assembly 10 proceeds by each rotor 20', 20" of the first and second electric motors 16', 16" driving first stage suns of the planetary reducers in the respective first and second gearing mechanisms 26', 26" and first stage carriers of the planetary reducers in the respective first and second gearing mechanisms 26', 26" driving a respective one of the output shafts 32.

In the third embodiment illustrated in FIG. 3, differentiation occurs via no connection between the wheels 36. However, as illustrated in FIGS. 4-5, the fourth and fifth embodiments of the e-axle assembly 10 additionally includes a torque coupling element 44 extending between and operably coupled to the first and second gearing mechanisms 26', 26" housed respectively in the hollows 24', 24" of the rotors 20', 20" for coupling the two, spaced but adjacent first and second electric motors 16', 16". Put another way, in the fourth and fifth embodiments, the coupling element 44 is added to couple the planetary reducers input (sun gear) or output (planet carrier) of the first and second gearing mechanisms 26', 26". This torque coupling element 44 can be arranged as viscous hydraulic, one-way clutches, or dog clutches, as examples. However, other means of torque coupling elements 44 could be utilized without departing from the scope of the subject disclosure.

As further illustrated in FIGS. 4-5, in the fourth and fifth embodiments, an electric coupling element 46 can also be added to extend between and couple current supplied to the first and second stators 18', 18" in each of the first and second electric motors 16', 16" disposed within the internal compartment 14 of the housing 11. More specifically, the electric coupling element 46 is operably connected with both of the first and second stators 18', 18" to establish a physical (contactor or transistor) series or parallel connection of the phase windings in the stators 18', 18". The electric coupling element 46 may also be accomplished with coordinated control of the phase current to the first and second electric motors 16', 16", with the goal of controlling torque and/or speed of each motor 16.

The torque coupling element 44 or the electric coupling elements 46 may be used at the same time when full axle torque is required at a single wheel. For example, in this case, the torque coupling element 44 may lock left to right and allow both of the first and second electric motors 16', 16" to apply torque to a single wheel of the electric or hybrid vehicle. When lower torque is required and higher efficiency is required, the torque coupling element 44 may lock or provide a small amount of left to right speed differentiation and allow a single motor to supply the required torque. In this case, the motor on the side with the higher speed requirement would typically drive, which allows a small amount of slip in the torque coupling element 44 to supply correct speed and torque to the other wheel. This shifting of torque drive from one motor to the other is accomplished with coordinated control of the phase current on both motors 16', 16" via the electric coupling element 46, which includes an electric control therebetween to allow the first and second motors 16', 16" to be controlled as one. In the fourth and fifth embodiments, differentiation occurs via coupling in free running mode, with torque transfer between the wheels facilitated via the torque coupling element 44 and the electric coupling elements 46.

As illustrated in FIG. 5, the fifth embodiment of the e-axle assembly 10 differs from the fourth embodiment in that the torque coupling element 44 may allow a non-linear angular displacement of the output shafts 32. In other words, the torque coupling element 44 can allow a non-coaxial and angular connection between the first and second gearing mechanisms 26', 26" housed in the first and second electric motors 16', 16", such that each of the first and second rotors 20', 20" extend along respective axis $A_1$, $A_2$ that are non-parallel and angled relative to one another. For example, this could be accomplished by incorporating a constant velocity joint or non-parallel axis gears into the torque coupling element 44. The angular displacement between the output shafts 32 may be fixed or variable depending on the needs of the vehicle's suspension.

Figure 6:
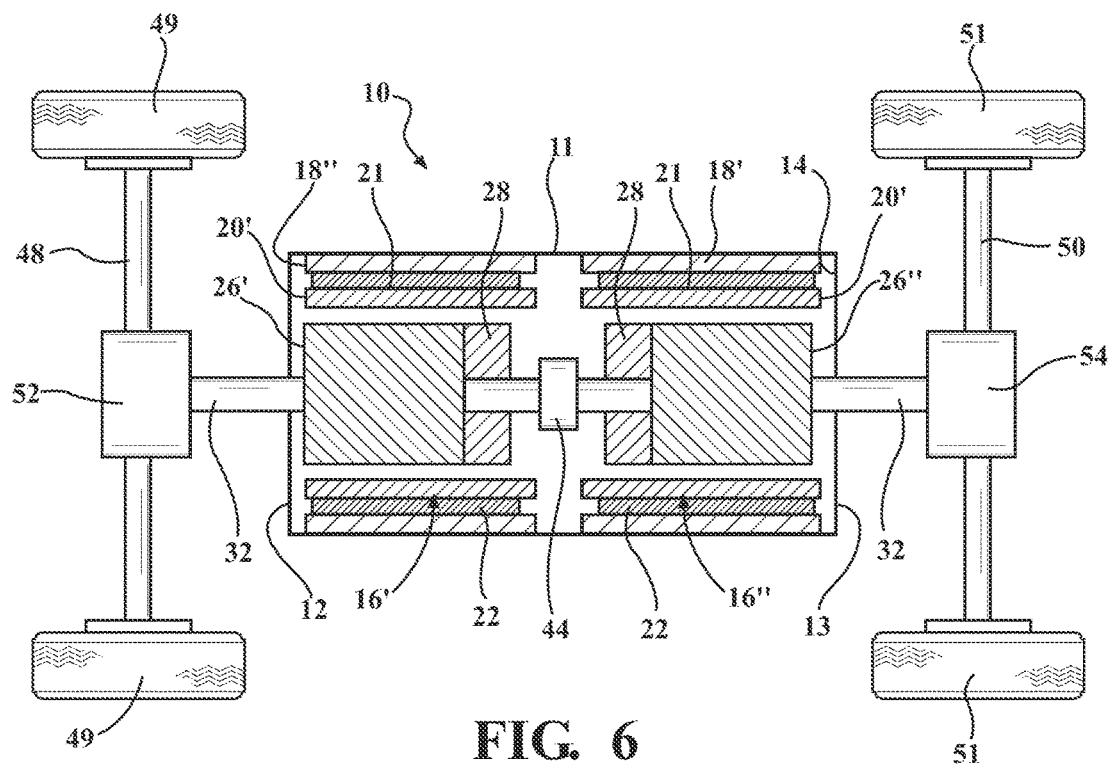
FIG. 6 illustrates a sixth embodiment of the e-axle assembly.

As illustrated in FIG. 6, in a sixth embodiment, the e-axle assembly 10 can be utilized to drive a front axle 48 connected to a pair of front wheels 49 and a rear axle 50 connected to a pair of rear wheels 51 of the electric vehicle in a 4-wheel drive configuration. In this embodiment, the e-axle assembly 10 is arranged similar to the fourth embodiment (or any other embodiment, for that matter), except that the pair of output shafts 32 extend out of the first and second housing ends 12, 13 and are respectively connected to a front differential 52 of the first axle 48 and a rear differential 54 of the rear axle 50. Thus, the torque coupling element 44 is arranged to allow locking of the planetary reducers in the first and second gearing mechanisms 26', 26" to supply full torque to either the front differential 52 or the rear differential 54. The axle differentials may allow torque coupling from left to right or locking from left to right. Thus, as illustrated in FIG. 6, the sixth embodiment of the e-axle assembly 10 includes the first and second electric motors 16', 16" each having a respective shift package which can be coupled together via the torque coupling element 44 to drive the front and rear axles 48, 50 of the electric or hybrid vehicle.

Figure 7:
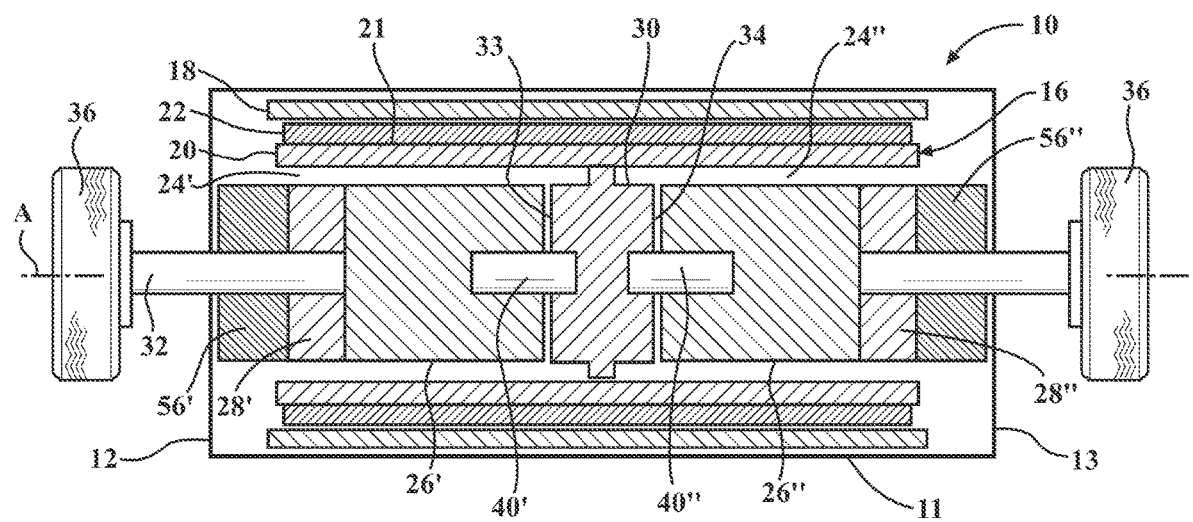
FIG. 7 illustrates a seventh embodiment of the e-axle assembly illustrating the additional incorporation of a final drive reduction gearing.

Each of the embodiments discussed previously are arranged with the final drive reduction (e.g., wheel end reducers 38) being located at the wheel-end. However, as illustrated in FIG. 7, each of these embodiments can additionally be modified to locate and incorporate final drive reduction gearing 56 into the e-axle assembly 10, and thus within the internal compartment 14 of the housing 12. Put another way, the final drive reduction gearing 56', 56" may be located in the internal compartment 14 and in operable connection with and between the gearing mechanism(s) 26 and the output shafts 32 for each of the respective motors 16', 16", as shown in the e-axle assembly 10 of FIG. 7. In this case, the final drive reduction gearing 56 may be coaxial/planetary gears, parallel axis gears or non-parallel axis gears.

Figure 8:
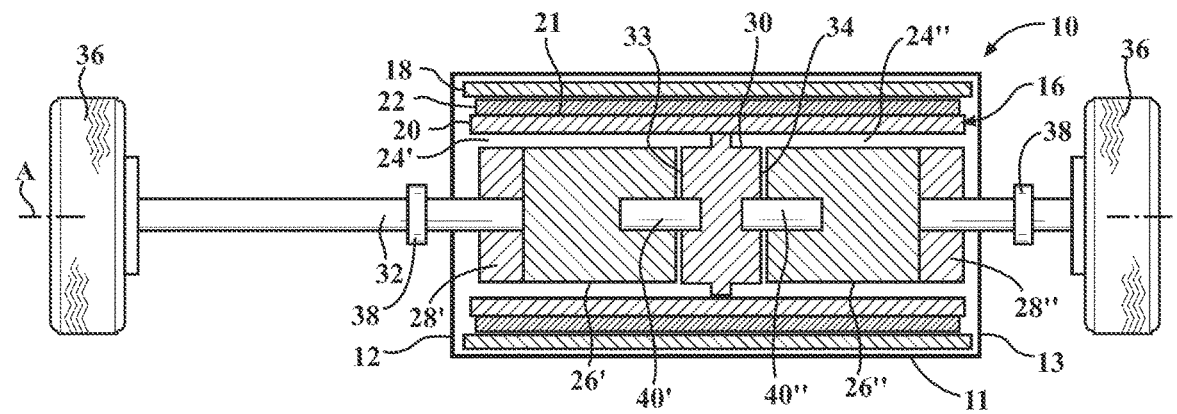
FIG. 8 illustrates an eighth embodiment of the e-axle assembly exemplarily illustrating that any of the aforementioned embodiments of the e-axle assembly can be positioned off of the vehicle's center.

Each of the embodiments discussed previously are also preferably arranged with the e-axle assembly 10 positioned along the vehicle's center. However, for each of these embodiments, the drive unit may also be positioned off of the vehicle's center, either to the left or the right (as illustrated in FIG. 8) to provide greater package flexibility and make space for other vehicle systems. For example, on a left-hand drive vehicle, the e-drive system may be packaged slightly to the right to allow room for a steering shaft and steering gear unit.

As with be appreciated in view of the foregoing description of the embodiments, the e-axle assembly 10 can provide a live axle motor and first stage reduction in the center, final drive at wheel end or final drive in center, or an independent suspension drive unit motor and first stage reduction in the center, final drive at wheel end or final drive in center. Further, although not described in detail, additional features for consideration include controls unique to live axle or center drive unit, axle beam structures unique to the motor/gearing subsystem, suspension structures unique to the motor/gearing subsystem, and brake/wheel-end/wheel-bearing structures unique to the motor/gearing subsystem. Furthermore, the term live axle is intended to refer to and include both solid beam-type axles and independently suspended axles, and thus the principles disclosed herein are applicable to both types of axles.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. An e-axle assembly for an electric or hybrid vehicle, comprising:
    a housing extending from a first housing end to a second housing end to define an internal compartment;
    a single electric motor disposed within said internal compartment and including a stator and a rotor rotatable relative to said stator about an axis;
    said rotor extending between a first rotor end and a second end and defining a hollow extending internally and continuously within said rotor between said first and second rotor ends;
    a first gearing mechanism and a first shifting actuator operably paired with one another and disposed within said hollow adjacent said first housing end and a second gearing mechanism and a second shifting mechanism operably paired with one another and disposed within said hollow adjacent said second housing end;
    said rotor operably connected to and driving a differential arranged centrally within said hollow to present a first differential side facing said first housing end and a second differential side facing said second housing end, wherein said first gearing mechanism is operably connected to said first differential side of said differential via a first gear shaft and said second gearing mechanism is operably connected to said second differential side of said differential via a second gear shaft; and
    a pair of output shafts each operably connected to a respective one of said first and second gearing mechanisms and extending outwardly from respective first and second housing ends of said housing for sending torque to wheels of the electric or hybrid vehicle.

2. An e-axle assembly for an electric or hybrid vehicle, comprising:
    a housing extending from a first housing end to a second housing end to define an internal compartment;
    a first electric motor and a second electric motor each disposed within said internal compartment in axially spaced relationship with one another and each adjacent a respective first and second housing end;
    said first electric motor including a first stator and a first rotor defining a first hollow extending within said first rotor;
    said second electric motor including a second stator and a second rotor defining a second hollow extending within said second rotor;
    a first gearing mechanism and a first shifting actuator disposed within said first hollow and a second gearing mechanism and a second shifting actuator disposed within said second hollow;
    said first rotor operably connected to and driving said first gearing mechanism and said second rotor operably connected to and driving said second gearing mechanism,
    a pair of output shafts operably connected to a respective one of said first and second gearing mechanisms and extending outwardly from respective first and second housing ends for sending output torque to wheels of the electric or hybrid vehicle; and
    a torque coupling element extending between and operably coupled to said first and second gearing mechanisms housed respectively in each of the first and second hollows, said torque coupling element selectively switchable from an unlocked condition wherein said first and second electric motors are unlocked from one another and individually and separately drive respective wheels of the electric or hybrid vehicle to a locked condition wherein said first and second electric motors are locked to one another to allow one or both of said first and second electric motors to supply torque to a single wheel of the electric or hybrid vehicle.

3. The e-axle assembly as set forth in claim 2, further comprising an electric coupling element extending between and operably coupled with said first and second stators to establish an electric connection between said first and second electric motors.

4. The e-axle assembly as set forth in claim 2, further comprising:
    said first rotor and said first hollow of said first electric motor arranged along an axis $A_1$;
    said second rotor and said second hollow of said second electric arranged along an axis $A_2$;
    said axis $A_1$, $A_2$ disposed in non-parallel and angled relationship to one another; and
    said torque coupling element configured to allow a non-angular displacement of said pair of output shafts.

* * * * *